(12) United States Patent
Chiang et al.

(10) Patent No.: US 11,632,574 B2
(45) Date of Patent: Apr. 18, 2023

(54) VIDEO PROCESSING METHODS AND APPARATUSES HAVING BDPCM SIZE CONSTRAINT CONSIDERING COLOR FORMAT SAMPLING STRUCTURE

(71) Applicant: HFI Innovation Inc., Zhubei (TW)

(72) Inventors: Man-Shu Chiang, Hsinchu (TW); Tzu-Der Chuang, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/766,903

(22) PCT Filed: Oct. 29, 2020

(86) PCT No.: PCT/CN2020/124850
§ 371 (c)(1),
(2) Date: Apr. 6, 2022

(87) PCT Pub. No.: WO2021/083279
PCT Pub. Date: May 6, 2021

(65) Prior Publication Data
US 2022/0360820 A1 Nov. 10, 2022

Related U.S. Application Data

(60) Provisional application No. 62/954,026, filed on Dec. 27, 2019, provisional application No. 62/927,180, filed on Oct. 29, 2019.

(51) Int. Cl.
*H04N 19/70* (2014.01)
*H04N 19/11* (2014.01)
(Continued)

(52) U.S. Cl.
CPC ............ *H04N 19/70* (2014.11); *H04N 19/11* (2014.11); *H04N 19/122* (2014.11);
(Continued)

(58) Field of Classification Search
CPC .... H04N 19/11; H04N 19/122; H04N 19/132; H04N 19/136; H04N 19/172;
(Continued)

(56) References Cited

U.S. PATENT DOCUMENTS 10,645,399 B2 5/2020 Jeon et al.
2007/0065026 A1 3/2007 Lee et al.
(Continued)

FOREIGN PATENT DOCUMENTS

CN 105684442 A 6/2016

OTHER PUBLICATIONS

International Search Report and Written Opinion dated Jan. 19, 2021, issued in application No. PCT/CN2020/124850.
(Continued)

*Primary Examiner* — Jessica M Prince
(74) *Attorney, Agent, or Firm* — McClure, Qualey & Rodack, LLP

(57) ABSTRACT

Video encoding or decoding methods and apparatuses receive input video data of a luma block and one or more corresponding chroma blocks, compare sizes of the luma and chroma blocks with a maximum transform skip size, and signal or parse a BDPCM luma enabling flag for the luma block when the size of the luma block is smaller than or equal to the maximum transform skip size, and signal or parse a BDPCM chroma enabling flag for the chroma block when the size of the chroma block is smaller than or equal to the maximum transform skip size. The size of the chroma block is derived from the size of the luma block and a color format sampling structure. The luma block is encoded/
(Continued)

decoded by BDPCM based on the BDPCM luma enabling flag and the chroma block is encoded/decoded by BDPCM according to the BDPCM chroma enabling flag.

21 Claims, 4 Drawing Sheets

(51) Int. Cl.
      *H04N 19/122*     (2014.01)
      *H04N 19/132*     (2014.01)
      *H04N 19/136*     (2014.01)
      *H04N 19/172*     (2014.01)
      *H04N 19/176*     (2014.01)
      *H04N 19/186*     (2014.01)
      *H04N 19/61*      (2014.01)

(52) U.S. Cl.
    CPC ......... *H04N 19/132* (2014.11); *H04N 19/136* (2014.11); *H04N 19/172* (2014.11); *H04N 19/176* (2014.11); *H04N 19/186* (2014.11); *H04N 19/61* (2014.11)

(58) Field of Classification Search
    CPC .. H04N 19/176; H04N 19/186; H04N 19/593; H04N 19/61; H04N 19/70
    See application file for complete search history.

(56) References Cited

U.S. PATENT DOCUMENTS

| | | |
|---|---|---|
| 2016/0227221 A1 | 8/2016 | Lai et al. |
| 2018/0278958 A1 | 9/2018 | Hsiang |
| 2022/0150542 A1* | 5/2022 | Yoo ...................... H04N 19/176 |
| 2022/0345737 A1* | 10/2022 | Choi ................... H04N 19/176 |
| 2022/0353506 A1* | 11/2022 | Yoo ...................... H04N 19/132 |

OTHER PUBLICATIONS

Chinese language office action dated Feb. 22, 2022, issued in application No. TW 109137624.

\* cited by examiner

VIDEO PROCESSING METHODS AND APPARATUSES HAVING BDPCM SIZE CONSTRAINT CONSIDERING COLOR FORMAT SAMPLING STRUCTURE

CROSS REFERENCE TO RELATED APPLICATION

The present invention claims priority to U.S. Provisional Patent Applications, Ser. No. 62/927,180, filed on Oct. 29, 2019, entitled "Transform Skip for Chroma with limiting maximum transform skip size", and U.S. Provisional Patent Applications, Ser. No. 62/954,026, filed on Dec. 27, 2019, entitled "Chroma BDPCM size constraint with chroma sampling". The U.S. Provisional Patent Applications are hereby incorporated by reference in their entireties.

FIELD OF THE INVENTION

The present invention relates to video processing methods and apparatuses in video encoding and decoding systems. In particular, the present invention relates to Block Differential Pulse Code Modulation (BDPCM) enabling conditions.

BACKGROUND AND RELATED ART

The High-Efficiency Video Coding (HEVC) standard relies on a block-based coding structure which divides each video slice into multiple square blocks referred to as Coding Tree Units (CTUs). A raster scan order is used to encode or decode CTUs in each slice. Each CTU contains one Coding Unit (CU) or recursively splits into four smaller CUs according to a quad-tree partitioning structure until a predefined minimum CU size is reached. The prediction decision is made at the CU level, where each CU is coded using either inter prediction or intra prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation identifies one (uni-prediction) or two (bi-prediction) best reference blocks for a CU coded using inter prediction in one or two reference pictures, and motion compensation in inter prediction locates the one or two best reference blocks according to one or two Motion Vectors (MVs). A CU coded using intra prediction is predicted by reference samples in the same picture. Prediction errors of a CU are differences between the CU and the predictor, and the prediction errors are split into one or more Transform Units (TUs) for transform and quantization.

The terms Coding Tree Block (CTB), Coding block (CB), Prediction Block (PB), and Transform Block (TB) are defined to specify two-dimensional (2-D) sample array of one color component associated with the CTU, CU, PU, and TU respectively. For example, a CTU consists of one luminance (luma) CTB for the Y component, two chrominance (chroma) CTBs for the Cb and Cr components, and its associated syntax elements. A similar relationship is valid for CU, PU, and TU. For example, a CU is composed of one luma CB and two chroma CBs, and a TU is composed of a TB of luma samples of size 8×8, 16×16, or 32×32 or four TBs of luma samples of size 4×4, and two corresponding TBs of chroma samples in a picture coded with the 4:2:0 color format. More specifically, a CU is consisted of a CB of luma samples and two corresponding CBs of chroma samples of a picture that has three sample arrays in the single tree mode, or a CB of luma samples of a picture that has three sample arrays in the dual tree mode, or two CBs of chroma samples of a picture that has three sample arrays in the dual tree mode, or a CB of samples of a monochrome picture, and syntax structures used to coded the samples. A TU is consisted of a TB of luma samples and two corresponding TBs of chroma samples of a picture when using a single coding unit tree for luma and chroma and syntax structures used to transform the transform block samples; or a TU is consisted of a TB of luma samples or two TBs of chroma samples when using two separate coding unit trees for luma and chroma and syntax structures used to transform the transform block samples. In the HEVC system, the same splitting structure is generally applied to both luma and chroma components unless a minimum size for the chroma block is reached.

Block Differential Pulse Code Modulation (BDPCM) Block Differential Pulse Code Modulation (BDPCM) has been developed to predict pixels in one or more of a luma component and chroma components of an intra CU using reconstructed samples in a horizontal or vertical direction. The reference pixels used in predicting each BDPCM block are unfiltered reconstructed samples. The prediction errors of a BDPCM block are quantized in a spatial domain, which means the transform operation is skipped for the BDPCM block. Pixels of the BDPCM block are reconstructed by adding the dequantized prediction errors to the prediction of the BDPCM block. For encoding or decoding a BDPCM block, each sample in the BDPCM block is predicted from neighboring samples in vertical and horizontal directions using the Median Edge Detector of LOCO-I. For a current pixel X in the BDPCM block having pixel A as the left neighbor, pixel B as the top neighbor, and C as the top-left neighbor, the predictor for the current pixel P(X) is derived by: P(X)=min(A,B) if C≥max(A,B); P(X)=max(A,B) if C≤min(A,B); and P(X)=A+B−C otherwise.

The top row of a BDPCM block is predicted using unfiltered reference pixels when the top and top-left neighbors are selected, and the left column of the BDPCM block is predicted using unfiltered reference pixels when the left and top-left neighbors are selected. The top row except for the first pixel is predicted using reconstructed pixels when the left neighbors are selected, and the left column except for the first pixel is predicted using reconstructed pixels when the top neighbors are selected. The remaining rows and columns of the BDPCM block are also predicted using reconstructed pixels. Pixels are processed in a raster scan order inside the BDPCM block. The differences between the predictor of the current block and the original data of the BDPCM block are the prediction errors, also referred to as residues of the current block, and the prediction errors of the BDPCM block are quantized in a spatial domain after rescaling, in a way identical to the transform and quantization operations in the Transform Skip (TS) mode. In other words, the TS mode is always applied to the BDPCM blocks. Each pixel is then reconstructed by adding the quantized prediction errors to the predictor. The reconstructed pixels are used to predict subsequent pixels in a raster scan order. Amplitudes and signs of the quantized prediction errors are encoded separately. A cbf_bdpcm_flag is first coded, and if this flag is equal to zero, all amplitudes of the current block are to be decoded as zero. If this flag is equal to 1, all amplitudes of the current block are encoded individually in a raster scan order. In order to keep the low complexity of BDPCM, values of these amplitudes are limited to at most 31 inclusive. The amplitudes are encoded using unary binarization, with three contexts for the first bin, then one context for each additional bin until the twelfth bin, and one context for all remaining bins. A sign is encoded in a bypass mode for each non-zero residue. The deblocking filters for both luma and chroma components are de-activated on a border between two BDPCM blocks, since neither of the two BDPCM blocks is processed by a transform operation, where the transform operation is usually responsible for blocking artifacts.

A BDPCM flag bdpcm_flag is transmitted at the CU level for each intra CU satisfying an enabling condition. The BDPCM flag bdpcm_flag for an intra CU indicates whether regular intra coding or BDPCM coding is applied to the intra CU, and the BDPCM flag bdpcm_flag is encoded using a single CABAC context.

In the upcoming emerging video coding standard Versatile Video Coding (VVC) developing by the Joint Collaborative Team on Video Coding (JCT-VC) group of video coding experts from ITU-T Study Group, an alternative scheme to BDPCM is called quantized Residual domain BDPCM (RDPCM, which was further renamed to Block-based Delta Pulse Code Modulation (BDPCM) in VVC). In the following, BDPCM means BDPCM defined in the VVC standard. A signaled BDPCM direction indicates whether vertical or horizontal prediction direction is employed. The intra prediction is performed on the entire block by sample copying according to the prediction direction similar to the regular intra coding. The reference pixels are used to predict rows or columns of a BDPCM block line by line. Pixels (or samples) are reconstructed by adding the dequantized prediction errors to the predictor. The residues are quantized and the differences between the quantized residues and the predictor (horizontal or vertical) are coded. For a current block of size M rows and N columns, let $r_{i,j}$, $0 \le i \le M-1$, $0 \le j \le N-1$ be the prediction residues after performing intra prediction horizontally or vertically using unfiltered samples from left or above block boundary samples. Left neighbor pixel values across the current block are copied to each column in the predictor for the current block if BDPCM is performed in the horizontal direction, and a top neighbor line is copied to each line in the predictor for the current block if BDPCM is performed in the vertical direction.

Let $Q(r_{i,j})$, $0 \le i \le M-1$, $0 \le j \le N-1$ denotes the quantized version of the residues $r_{i,j}$, where the residues are differences between original block values and predicted block values. Then BDPCM is applied to the quantized residual samples, resulting in modified M×N array $\tilde{R}$ with elements $\tilde{r}_{i,j}$. When the vertical direction is signaled, the residual quantized samples are derived by:

$$\tilde{r}_{i,j} = \begin{cases} Q(r_{i,j}), & i = 0, \quad 0 \le j \le (N-1) \\ Q(r_{i,j}) - Q(r_{(i-1),j}), & 1 \le i \le (M-1), \quad 0 \le j \le (N-1) \end{cases}.$$

For the horizontal prediction, similar rules apply, and the residual quantized samples are obtained by $$\tilde{r}_{i,j} = \begin{cases} Q(r_{i,j}), & 0 \le i \le (M-1), \quad j = 0 \\ Q(r_{i,j}) - Q(r_{i,(j-1)}), & 0 \le i \le (M-1), \quad 1 \le j \le (N-1) \end{cases}.$$

The residual quantized samples $\tilde{r}_{i,j}$ are sent to the decoder. On the decoder side, the above calculations are reversed to generate quantized residues $Q(r_{i,j})$, $0 \le i \le M-1$, $0 \le j \le N-1$. For the vertical prediction case, the quantized residues are derived by:

$$Q(r_{i,j}) = \Sigma_{k=0}^{i} \tilde{r}_{k,j}, \; 0 \le i \le (M-1), \; 0 \le j \le (N-1).$$

For the horizontal prediction case, the quantized residues are derived by:

$$Q(r_{i,j}) = \Sigma_{k=0}^{j} \tilde{r}_{i,k}, \; 0 \le i \le (M-1), \; 0 \le i \le (N-1).$$

The inverse quantized residues, $Q^{-1}(Q(r_{i,j}))$, are added to the intra prediction values to produce the reconstructed sample values.

Syntax Table for BDPCM In the original BDPCM design, the block-level syntax of BDPCM is signaled at CU or Code Block (CB) level, a BDPCM flag bdpcm_flag is signaled to indicate whether to enable BDPCM when a current CU/CB is a luma intra CU/CB and the CB width and/or height is smaller than or equal to a predefined threshold. Some examples of the predefined threshold are 16, 32, 64, 128, 256, 512, and 1024. In cases when the BDPCM flag bdpcm_flag is true, one additional flag bdpcm_dir_flag is signaled to the prediction direction used in BDPCM. For example, the horizontal direction is employed when the flag bdpcm_dir_flag is equal to 0, otherwise the vertical direction is employed when the flag bdpcm_dir_flag is equal to 1. BDPCM may be applied to one or both the luma and chroma components. The syntax table for BDPCM is shown as follows.

| | |
|---|---|
| if( sps_bdpcm_enabled_flag && | |
|     cbWidth <= MaxTsSize && cbHeight <= MaxTsSize ) | |
|   intra_bdpcm_luma_flag | ae(v) |
| if( intra_bdpcm_luma_flag ) | |
|   intra_bdpcm_luma_dir_flag | ae(v) |

| | |
|---|---|
| if( cbWidth <= MaxTsSize && cbHeight <= MaxTsSize && | |
|   sps_bdpcm_chroma_enabled_flag ) { | |
|   intra_bdpcm_chroma_flag | ae(v) |
|   if( intra_bdpcm_chroma_flag ) | |
|     intra_bdpcm_chroma_dir_flag | ae(v) |
| } else { | |

Transform Skip Mode Transform Skip (TS) mode is a coding tool processes a quantized residual signal by entropy coding without going through the transform operation. A residual signal of a block coded in the TS mode is encoded directly in a sample domain instead of transforming into a frequency domain. TS mode is found to be particularly beneficial for screen content coding especially for regions with sharp edges and simple colors. TS mode may be controlled by high level syntax elements, for example, an enabling flag is used to select enabling or disabling the TS mode, and a syntax element is used to signal a size constraint for applying the TS mode. In an example, the TS mode is only allowed to be applied to a transform block with a width and height smaller than or equal to 32 samples. The TS mode may be applied to both luma and chroma components by applying transform skip residual coding to luma TBs and chroma TBs. The TS mode is enabled for the chroma components in all chroma sampling formats. The maximum transform skip size MaxTsSize is a fixed integer or a variable derived from a syntax element log 2_transform_skip_max_size_minus2 explicitly signaled in the Picture Parameter Set (PPS), for example, the maximum transform skip size is equal to 1<<(log 2_transform_skip_max_size_minus2+2), where the syntax element log 2_trasnform_skip_max_size_minus2 is used to specify the maximum block size for the TS mode, and the range of this syntax element is 0 to 3. This syntax element log 2_transform_skip_max_size_minus2 is inferred to be equal to 0 when it is not present in the video bitstream.

The TS mode size constraint for a luma transform block defines the TS mode can only be enabled if the width of the luma transform block is smaller than or equal to MaxTsSize and the height of the luma transform block is smaller than or equal to MaxTsSize. The TS mode size constraint for a chroma transform block defines the TS mode can only be enabled if the width of the chroma transform block wC is smaller than or equal to MaxTsSize and the height of the chroma transform block hC is smaller than or equal to MaxTsSize. The width of the chroma transform block wC is calculated by dividing the width of the corresponding luma transform block tbWidth with a variable SubWdithC as shown in the following:

$wC = tbWidth/SubWidthC;$ similarly, the height of the chroma transform block hC is calculated by dividing the height of the corresponding luma transform block tbHeight with a variable SubHeightC as shown in the following:

$hC = tbHeight/SubHeightC.$

The variables SubWidthC and SubHeightC are specified in the following table depending on the color format sampling structure, which are specified through an index chroma_format_idc and/or a flag separate_colour_plane_flag. Other values of the index chroma_format_idc and other values of the variables SubWidthC and SubHeightC may be specified in the future.

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

BRIEF SUMMARY OF THE INVENTION

In exemplary embodiments of the video encoding or decoding method, a video encoding or decoding system receives input video data associated with a luma block and one or more corresponding chroma blocks in a current picture or receives input compressed video data associated with a luma block and one or more corresponding chroma blocks in a current picture, compares a maximum transform skip size with a size of the luma block and compares a maximum transform skip size with a size of the chroma block, signals or parses a BDPCM luma enabling flag for the luma block when the size of the luma block is smaller than or equal to the maximum transform skip size, and/or signals or parses a BDPCM chroma enabling flag for the chroma block when the size of the chroma block is smaller than or equal to the maximum transform skip size. The BDPCM luma enabling flag and the BDPCM chroma enabling flag are block level BDPCM enabling flags signaled in a luma CB and chroma CBs respectively. The video encoding or decoding system applies BDPCM on the luma block when the BDPCM luma enabling flag for the luma block indicates BDPCM is enabled or applies intra prediction on the luma block when the BDPCM luma enabling flag for the luma block indicates BDPCM is disabled, applies BDPCM on the chroma block when the BDPCM chroma enabling flag for the chroma block indicates BDPCM is enabled or applies intra prediction on the chroma block when the BDPCM chroma enabling flag for the chroma block indicates BDPCM is disabled, and encoding or decoding the luma block and the chroma block. Pixels in the luma block are predicted using reconstructed luma samples in a horizontal or vertical direction when BDPCM is applied on the luma block; similarly, pixels in the chroma block are predicted using reconstructed chroma samples in a horizontal or vertical direction when BDPCM is applied on the chroma block. An example of the luma block and the one or more chroma blocks are Coding Blocks (CBs) belong to the same Coding Unit (CU) For example, each CU has three CBs consisting one luma CB and two chroma CBs. In another example, each CU has one or more CBs consisting one or more luma CBs and/or one or more chroma CBs. In one example, each TU has three TBs consisting one luma TB and two chroma TBs. In another example, each TU has one or more TBs consisting one or more luma TBs and/or one or more chroma TBs.

In some embodiments, comparing of the maximum transform skip size with the size of the chroma block comprises comparing the maximum transform skip size with a width and with a height of the chroma block. The width of the chroma block is derived by a width of the luma block and a color format sampling structure of the input video data and the height of the chroma block is derived by a height of the luma block and the color format sampling structure of the input video data. In one embodiment, the width of the chroma block is equal to the width of the luma block divided by a variable SubWidthC and the height of the chroma block is equal to the height of the luma block divided by a variable SubHeightC. The variable SubWidthC is equal to 2 when a color format is 4:2:0 or 4:2:2, and is equal to 1 when the color format is monochrome or 4:4:4. The variable SubHeightC is equal to 2 when the color format is 4:2:0, and is equal to 1 when the color format is monochrome, 4:2:2, or 4:4:4.

A BDPCM luma direction flag is signaled or parsed to indicate whether the horizontal or vertical direction is applied to predict the luma block when the BDPCM luma enabling flag indicates BDPCM is enabled. A BDPCM chroma direction flag is signaled or parsed to indicate whether the horizontal or vertical direction is applied to predict the chroma block when the BDPCM chroma enabling flag indicates BDPCM is enabled. In some embodiments, a Sequence Parameter Set (SPS) level BDPCM luma enabling flag and a SPS level BDPCM chroma enabling flag are signaled in the SPS associated with the current picture or parsed from the SPS associated with the current picture. In some embodiments, a single Sequence Parameter Set (SPS) level BDPCM enabling flag is signaled in the SPS associated with the current picture or parsed from the SPS associated with the current picture and the SPS level BDPCM enabling flag controls the usages of BDPCM for both luma and chroma blocks. In the following, a single SPS level BDPCM enabling flag is taken as an example. The BDPCM luma enabling flag is only signaled or parsed when the SPS level BDPCM enabling flag indicates BDPCM is enabled, and the BDPCM chroma enabling flag is only signaled or parsed when the SPS level BDPCM enabling flag indicates BDPCM is enabled.

The luma block comprises one or more luma transform blocks and the one or more chroma blocks comprise one or more chroma transform blocks. Some embodiments of the video encoding or decoding system further signals or parses a transform skip enabling flag for the luma transform block when the size of the luma transform block is smaller than or equal to the maximum transform skip size, and/or signals or parses a transform skip enabling flag for the chroma transform block when the size of the chroma transform block is smaller than or equal to the maximum transform skip size. The transform skip enabling flag for the luma transform block is a block level transform skip luma enabling flag and the transform skip enabling flag for the chroma transform block is a block level transform skip chroma enabling flag. Residues of the luma transform block are processed by a transform skip mode when the transform skip enabling flag for the luma transform block indicates the transform skip mode is enabled, and residues of the chroma transform block are processed by the transform skip mode when the transform skip enabling flag for the chroma transform block indicates the transform skip mode is enabled. The transform skip mode is applied to process the residues of the luma transform block when BDPCM is applied on the luma block and the transform skip mode is applied to process the residues of the chroma transform block when BDPCM is applied on the chroma block. Since residues of BDPCM blocks are always processed by the TS mode, BDPCM can be enabled only when the TS enabling condition is satisfied.

A syntax element associated with the maximum transform skip size is signaled in or parsed from a SPS or Picture Parameter Set (PPS) corresponding to the current picture according to some embodiments. The maximum transform skip size (MaxTsSize) defines a maximum block width or height allowed for selecting a transform skip mode. Residues of a transform block are encoded or decoded without a transform operation when the transform block is processed by the transform skip mode. For example, the value of MaxTsSize can be derived by 1<<(log 2_transform_skip_max_size_minus2+2). The syntax element log 2_transform_skip_max_size_minus2 is explicitly signaled in the PPS or SPS. For example, the maximum transform skip size is equal to 1<<(log 2_transform_skip_max_size_minus2+2), where the syntax element log 2_trasnform_skip_max_size_minus2 is used to specify the maximum block size for the TS mode, and the range of this syntax element is 0 to 3. This syntax element log 2_transform_skip_max_size_minus2 is inferred to be equal to 0 when it is not present in the video bitstream. When a CU is coded in the transform skip mode, its prediction residues are quantized and coded using a transform skip residual coding process.

Aspects of the disclosure further provide an apparatus for performing video encoding or decoding in a video encoding or decoding system. The apparatus comprises one or more electronic circuits configured for receiving input video data of a luma block and one or more corresponding chroma blocks in a current picture, comparing a maximum transform skip size with a size of the luma block, and comparing the maximum transform skip size with a size of the chroma block. BDPCM is only allowed to be applied to the luma block when the size of the luma block is smaller than or equal to the maximum transform skip size, and BDPCM is only allowed to be applied to the one or more chroma blocks when the size of the chroma block is smaller than or equal to the maximum transform skip size.

In other exemplary embodiments of the video encoding or decoding method, a video encoding or decoding system receives input video data associated with a current block in a current picture, checks a BDPCM enabling condition for the current block, signals or parses one or more BDPCM enabling flags for the current block when the BDPCM enabling condition is satisfied, applies BDPCM on one or more color components of the current block when the one or more BDPCM enabling flags for the current block indicate BDPCM is enabled, checks a transform skip mode enabling condition for transform blocks in the current block, signals or parses one or more transform skip enabling flags for the transform blocks in the current block when the transform skip mode enabling condition is satisfied, applies a transform skip mode on one or more color components of the transform blocks in the current block when the one or more transform skip enabling flags for the transform blocks in the current block indicate the transform skip mode is enabled, and encodes or decodes the current block in the current picture. The transform skip mode enabling condition is aligned with the BDPCM enabling condition for the current block. The BDPCM enabling condition and the transform skip mode enabling condition correspond to a size constraint for one or more luma components and/or a size constraint for one or more chroma components. In some embodiments of the present invention, the size constraint for the one or more luma components compares a size of a luma block in the current block to a maximum transform skip size and the size constraint for the one or more chroma components compares a size of a chroma block in the current block to the maximum transform skip size. For example, the size of the chroma block comprises a width and a height of the chroma block, where the width of the chroma block is derived by a width of the luma block and a color format sampling structure of the input video data and the height of the chroma block is derived by a height of the luma block and the color format sampling structure of the input video data. In one embodiment, the width of the chroma block is equal to the width of the luma block divided by a variable SubWidthC and the height of the chroma block is equal to the height of the luma block divided by a variable SubHeightC. The variable SubWidthC is equal to 2 when a color format is 4:2:0 or 4:2:2 or is equal to 1 when the color format is monochrome or 4:4:4. The variable SubHeightC is equal to 2 when the color format is 4:2:0 or is equal to 1 when the color format is monochrome, 4:2:2, or 4:4:4. A syntax element associated with the maximum transform skip size is signaled in or parsed from a SPS or PPS corresponding to the current picture.

In another embodiment, both the size constraint for the luma component and the size constraint for the chroma components compare a size of a luma block in the current block to a maximum transform skip size. In yet another embodiment, the size constraint for the luma component compares a size of a luma block in the current block to a maximum transform skip size and the size constraint for the chroma components compares a size of the luma block in the current block to an adjusted maximum transform skip size. The adjusted maximum transform skip size is derived by the maximum transform skip size and a color format sampling structure of the input video data.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 1:
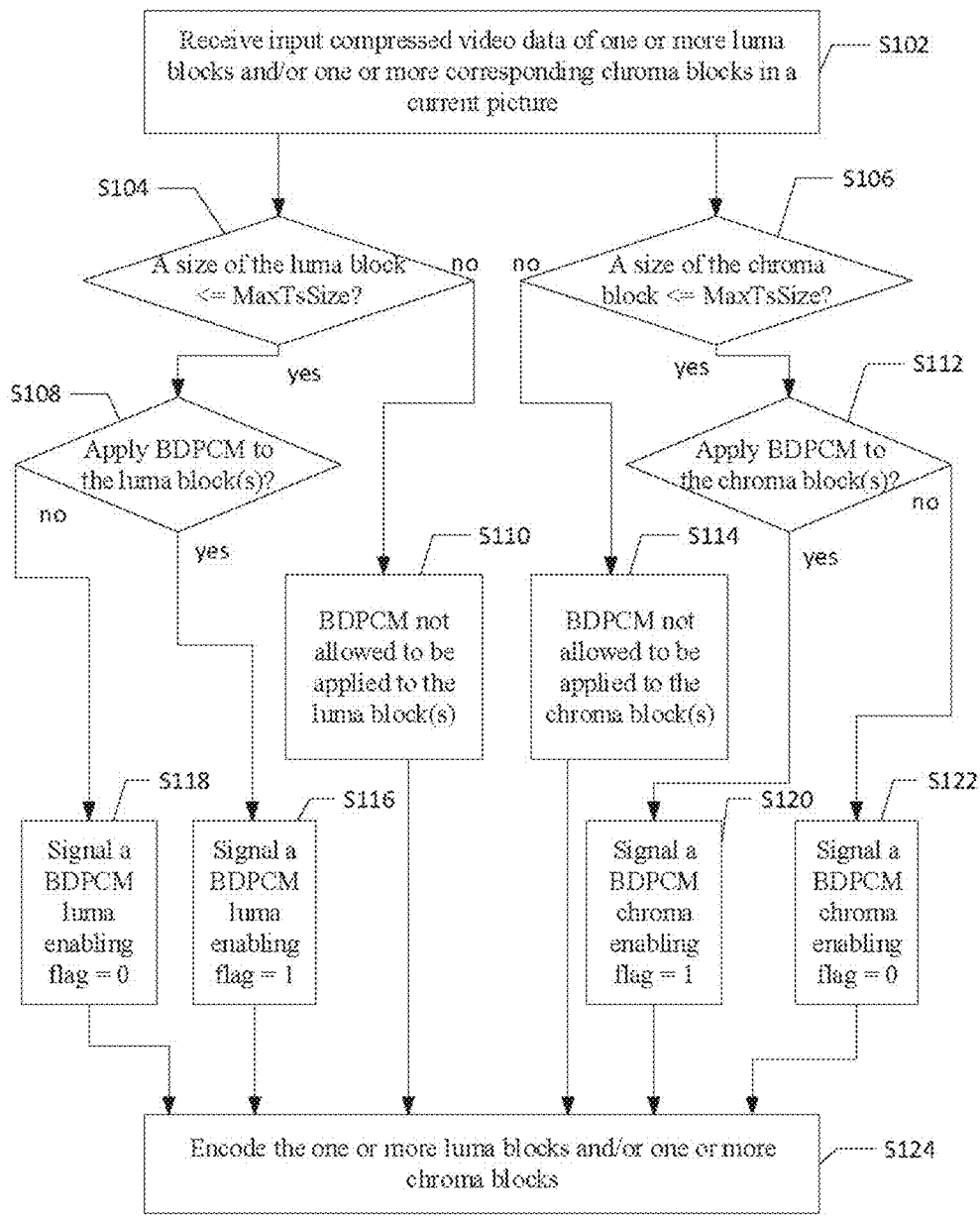
FIG. 1 is a flowchart illustrating an exemplary video processing method for a video encoding system according to an embodiment of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

A syntax element associated with the maximum transform skip size MaxTsSize is signaled in the video bitstream and is shared between luma and chroma components. The TS mode size constraint for the luma component is related to comparisons between MaxTsSize and a width of a luma block and between MaxTsSize and a height of the luma block. The TS mode size constraint for the chroma components is related to comparisons between MaxTsSize and a width of a chroma block and between MaxTsSize and a height of the chroma block. It is possible for the TS mode to be enabled for a chroma block even though the TS mode cannot be enabled for the associated luma block for some color formats. However, the BDPCM size constraint for both the luma and chroma components is only related to comparisons between MaxTsSize and a width of a luma block and between MaxTsSize and a height of the luma block regardless the chroma format sampling structure of the video data. Various embodiments of the present invention align the enabling conditions for the TS mode and BDPCM as the TS mode is always applied to process residues of BDPCM blocks.

The enabling condition for the TS mode or BDPCM includes a size constraint for a luma component, chroma components, or both the luma and chroma components. In various embodiments of the present invention, the TS mode, BDPCM, or both the TS mode and BDPCM are only enabled when the corresponding size constraint is satisfied. The size constraint for the TS mode, BDPCM, or both the TS mode and BDPCM in the following embodiments is related to one or a combination of a block width, a block height, and a block area of a Transform Unit (TU), a luma Transform Block (TB), a chroma TB, a Coding Unit (CU), a luma Coding Block (CB), or a chroma CB. An enabling flag determining whether the TS mode or BDPCM is applied is explicitly signaled at a TU, TB, CU, CB, CTU, CTB, slice, tile, tile group, Sequence Parameter Set (SPS), Picture Parameter Set (PPS), or picture when the size constraint is satisfied.

Set Size Constraint to BDPCM Inherited Based on Color Format Sampling Structure In an embodiment of the present invention, the actual width of a chroma block in a current picture and the actual height of the chroma block, which considered the color format sampling structure, are used to set the BDPCM size constraint for the chroma block. The chroma block and/or its corresponding luma block in the current picture are intra blocks. For example, the chroma block is a CB or TB within an intra CU or TU. By comparing the actual width and height of the chroma block with the maximum transform skip size MaxTsSize rather than comparing the width and height of a corresponding luma block with MaxTsSize, the BDPCM size constraints are separately set for the luma and chroma components. That is, BDPCM may be applied to the chroma blocks even when BDPCM is not allowed to be applied to the corresponding luma block in this embodiment. An exemplary syntax table implementing this embodiment is shown in the follows.

```
if( sps_bdpcm_enabled_flag && cbWidth <= MaxTsSize &&
cbHeight <= MaxTsSize)
    intra_bdpcm_luma_flag                                    ae(v)
    if( intra_bdpcm_luma_flag )
        intra_bdpcm_luma_dir_flag                            ae(v)
    if( (cbWidth/SubWidthC) <= MaxTsSize &&
(cbHeight/SubHeightC) <= MaxTsSize && sps_bdpcm_ enabled_flag ) {
        intra_bdpcm_chroma_flag                              ae(v)
        if( intra_bdpcm_chroma_flag )
            intra_bdpcm_chroma_dir_flag                      ae(v)
} else {...
```

In this embodiment, a BDPCM chroma enabling flag intra_bdpcm_chromna_flag is only signaled for a chroma block when the width of the chroma block is smaller than or equal to the maximum transform skip size MaxTsSize and the height of the chroma block is smaller than or equal to MaxTsSize. The width of the chroma block is calculated by dividing the width of the corresponding luma block cbWidth with a variable SubWidthC and the height of the chroma block is calculated by dividing the height of the corresponding luma block cbHeight with a variable SubHeightC. The variables SubWidthC and SubHeightC are set depending on the color format sampling structure, for example, these variables are set according to a value of an index chroma_format_idc. The index chroma_format_idc is set to 0 when the chroma format corresponds to monochrome, the index chroma_format_idc is set to 1, 2, 3, or 4 when the chroma format corresponds to 4:2:0, 4:2:2, or 4:4:4 respectively. The variable SubWidthC is set to 1 when the chroma_format_idc is equal to 0 or 3 or 4 and the variable SubWidthC is set to 2 when the chroma_format_idc is equal to 1 or 2. The variable SubHeightC is set to 1 when the chroma_format_idc is equal to 0, 2, 3 or 4 and the variable SubHeightC is set to 2 when the chroma_format ide is equal to 1. In other words, the variable SubWidthC is equal to 2 when the color format is 4:2:0 or 4:2:2, otherwise the variable SubWidthC is equal to 1; and the variable SubHeightC is equal to 2 when the color format is 4:2:0, otherwise the variable SubHeightC is equal to 1.

BDPCM is applied to predict the chroma block in the current picture when the BDPCM chroma enabling flag intra_bdpcm_chroma_flag for the chroma block indicates BDPCM is enabled, otherwise intra prediction is applied to predict the chroma block when the BDPCM chroma enabling flag intra_bdpcm_chroma_flag for the chroma block indicates BDPCM is disabled. A BDPCM chroma direction flag intra_bdpcm_chroma_dir_flag is also signaled in the video bitstream to indicate whether a horizontal or vertical direction is applied to predict the chroma block when the BDPCM chroma enabling flag intra_bdpcm_chroma_flag for the chroma block indicates BDPCM is enabled. It is further noted that the video encoding system signals a SPS level BDPCM enabling flag sps_bdpcm_enabled_flag in the SPS associated with the current picture, and the video decoding system parses the SPS level BDPCM enabling flag from the SPS. The BDPCM chroma enabling flag intra_bdpcm_chroma_flag for the chroma block in the current picture is only signaled or parsed when the SPS level BDPCM enabling flag sps_bdpcm_enabled_flag indicates BDPCM is enabled for the current picture.

In the above syntax table, a BDPCM luma enabling flag intra_bdpcm_luma_flag for a corresponding luma block is only signaled when a SPS level BDPCM enabling flag sps_bdpcm_enabled_flag indicates BDPCM is enabled and when a BDPCM size constraint for the luma component is satisfied. The BDPCM size constraint compares a width of the luma block with the maximum transform skip size and a height of the luma block with the maximum transform skip size. The BDPCM size constraint is satisfied when the width of the luma block is smaller than or equal to the maximum transform skip size MaxTsSize and the height of the luma block is smaller than or equal to MaxTsSize. The luma block is predicted by BDPCM when the BDPCM luma enabling flag is true or the luma block is predicted by intra prediction when the BDPCM luma enabling flag is false. A BDPCM luma direction flag intra_bdpcm_luma_dir_flag is signaled or parsed when the BDPCM luma enabling flag indicates BDPCM is enabled. This BDPCM luma direction flag indicates whether a horizontal or vertical direction is applied to predict the luma block. In one embodiment, the BDPCM chroma enabling flag intra_bdpcm_chroma_flag is signaled for one or more chroma CBs of a CU, for example, Cb and Cr components share the same BDPCM chroma enabling flag. The BDPCM luma enabling flag intra_bdpcm_luma_flag is signaled for one or more luma CBs of a CU.

In another embodiment of the present invention, the maximum block size allowed for applying BDPCM is altered according to the color format sampling structure or chroma sampling of video data. The altered maximum block size allowed for applying BDPCM is also referred to as an adjusted maximum block size in the following embodiments. An exemplary syntax table of this embodiment is shown in the following.

```
if( cbWidth <= (MaxTsSize/SubWidthC) && cbHeight <=
(MaxTsSize/SubHeightC) && sps_bdpcm_ enabled_flag ) {
    intra_bdpcm_chroma_flag                          ae(v)
```

In the above exemplary syntax table, the BDPCM chroma enabling flag intra_bdpcm_chroma_flag is only signaled for a chroma block when a SPS level BDPCM enabling flag sps_bdpcm_enabled_flag is true and when both the width of a corresponding luma block is smaller than or equal to the maximum transform skip size MaxTsSize divided by a variable SubWidthC, and the height of the corresponding luma block is smaller than or equal to MaxTsSize divided by a variable SubHeightC. The maximum transform skip size MaxTsSize is signaled in the video bitstream for the BDPCM size constraint for the luma component, and by dividing MaxTsSize with the variable SubWidthC or SubHeightC, an adjusted maximum block width or height is derived for the BDPCM size constraint for the chroma components. In this embodiment, although the corresponding luma block size is used to determine whether BDPCM can be applied for the chroma components, the adjusted maximum block size allowed for applying BDPCM is set to a smaller value when the variable SubWidthC or SubHeightC is larger than 1.

In yet another embodiment of the present invention, the BDPCM size constraint for the chroma components compares the chroma block size with an adjusted maximum block size allowed for applying BDPCM on the chroma blocks, where the adjusted maximum block size allowed for applying BDPCM on the chroma blocks is derived by the maximum transform skip size MaxTsSize considering the color format sampling structure or chroma sampling. The following syntax table illustrates an example of this embodiment.

```
if( (cbWidth/SubWidthC) <= (MaxTsSize/SubWidthC) &&
(cbHeight/SubHeightC) <= (MaxTsSize/SubHeightC) && sps_bdpcm_
enabled_flag ) {
    intra_bdpcm_chroma_flag                          ae(v)
```

The BDPCM chroma enabling flag intra_bdpcm_chroma_flag is only signaled for a chroma block when the SPS level BDPCM enabling flag sps_bdpcm_enabled_flag is true and when both the width of the chroma block (i.e. cbWidth/SubWidthC) is smaller than or equal to an adjusted maximum block width (i.e. MaxTsSize/SubWidthC) and the height of the chroma block (i.e. cbHeight/SubHeightC) is smaller than or equal to an adjusted maximum block height (i.e. MaxTsSize/SubHeightC).

Align Enabling Condition for Transform Skip Mode and BDPCM In some embodiments of the present invention, the enabling condition for the TS mode is set to be the same as the enabling condition for BDPCM because the TS mode is always used to process the residues of each BDPCM block. For example, the enabling condition relates to the size constraint, more specifically, the size constraint for enabling the TS mode and the size constraint for enabling BDPCM are aligned. In one specific embodiment, the size constraint for both the TS mode and BDPCM compares a luma block size with the maximum transform skip size MaxTsSize for the luma component and compares a chroma block size with MaxTsSize for the chroma components to determine whether the TS mode as well as BDPCM can be enabled. In one embodiment, the same value of MaxTsSize is shared between luma and chroma components. At the video encoder end, a BDPCM luma enabling flag is signaled in the video bitstream when the luma block size is smaller than or equal to MaxTsSize, and a BDPCM chroma enabling flag is signaled in the video bitstream when the chroma block size is smaller than or equal to MaxTsSize. Similarly, a transform skip enabling flag for a luma block is only signaled in the video bitstream when the luma block size is smaller than or equal to MaxTsSize, and a transform skip enabling flag for a chroma block is only signaled in the video bitstream when the chroma block size is smaller than or equal to MaxTsSize. The video decoder parses the BDPCM luma enabling flag only when the luma block size is smaller than or equal to MaxTsSize and parses the BDPCM chroma enabling flag only when the chroma block size is smaller than or equal to MaxTsSize. The video decoder decodes the luma or chroma block by BDPCM if the corresponding BDPCM enabling flag indicates BDPCM is enabled. The video decoder parses a transform skip enabling flag for the luma block only when the luma block size is smaller than or equal to MaxTsSize and parses a transform skip enabling flag for the chroma block only when the chroma block size is smaller than or equal to MaxTsSize. The transform skip mode is applied to the luma block or chroma block according to the corresponding transform skip enabling flag.

In another embodiment, the size constraint for both the TS mode and BDPCM compares a luma block size with MaxTsSize for both the luma and chroma components to determine whether the TS mode as well as BDPCM can be enabled. In another embodiment, the size constraint for both the TS mode and BDPCM compares a luma block size with MaxTsSize for the luma component and compares the luma block size with an adjusted maximum transform skip size for the chroma components to determine whether the TS mode as well as BDPCM can be enabled. The adjusted maximum transform skip size for the chroma components is derived from MaxTsSize considering the color format sampling structure of the video data, for example, an adjusted maximum transform skip width for the chroma components is equal to MaxTsSize divided by a variable SubWidthC and an adjusted maximum transform skip height for the chroma components is equal to MaxTsSize divided by a variable SubHeightC. The values of the variables SubWidthC and SubHeightC depend on the color sampling format. For example, the adjusted maximum transform skip block width for the chroma components is half of the maximum transform skip block width for the luma component when the color sampling format of the video data is 4:2:0 or 4:2:2, and the adjusted maximum transform skip block height for the chroma components is half of the maximum transform skip block height for the luma component when the color sampling format of the video data is 4:2:0, otherwise the adjusted maximum transform skip block width and height for the chroma component are the same as the maximum transform skip block width and height for the luma component. In yet another embodiment, the size constraint for both the TS mode and BDPCM compares a luma block size with MaxTsSize for the luma component and compares a chroma block size with the adjusted maximum transform skip size for the chroma components to determine whether the TS mode as well as BDPCM can be enabled.

Transform Skip Mode Size Constraint Aligned for Luma and Chroma Components In some embodiments of the present invention, the TS mode size constraint for the luma component is aligned with the TS mode size constraint for the chroma components. In one embodiment, the size constraint for the TS mode compares a chroma block width wC with an adjusted maximum transform skip block width and a chroma block height hC with an adjusted maximum transform skip block height to determine whether the TS mode can be enabled for the luma block and chroma blocks. The adjusted maximum transform skip block width is derived by dividing the maximum transform skip block size MaxTsSize with a variable SubWidthC and the adjusted maximum transform skip block height is derived by dividing the maximum transform skip block size MaxTsSize with a variable SubHeightC. The following syntax table demonstrates an example of the TS mode enabling condition for the chroma components.

```
if( sps_transform_skip_enabled_flag && !BdpcmFlag[ x0 ][ y0 ][ 1 ]
&& wC <= (MaxTsSize/SubWidthC) && hC <= (MaxTsSize/SubHeightC)
&& !cu_sbt_flag )
    transform_skip_flag[ xC ][ yC ][ 1 ]                               ae(v)
```

```
if( sps_transform_skip_enabled_flag && !BdpcmFlag[ x0 ][ y0 ][ 2 ] &&
wC <= (MaxTsSize/SubWidthC) && hC <= (MaxTsSize/SubHeightC) &&
!cu_sbt_flag )
    transform_skip_flag [ x0 ][ y0 ][ 2 ]                              ae(v)
if( !transform_skip_flag[ x0 ][ y0 ][ 2 ] )
```

The transform skip enabling flag transform_skip_flag[x0][y0][cIdx] specifies whether a transform operation is applied to the associated transform block. The array indices x0, y0 specify the location (x0,y0) of the top-left luma sample of the considered transform block relative to the top-left luma sample of the picture. The array index cIdx specifies an indicator for the color component, which is equal to 0 for the luma component Y, 1 for the chroma component Cb, and 2 for the chroma component Cr. In other words, a first TS flag transform_skip_flag[x0][y0][[0] is signaled in a luma TB, a second TS flag transform_skip_flag[x0][y0][1] is signaled in a Cb chroma TB, and a third TS flag transform_skip_flag[x0][y0][2] is signaled in a Cr chroma TB. A TS flag transform_skip_flag[x0][y0][cIdx] equals to 1 specifying that the transform operation is not applied to the associated transform block, and this TS flag transform_skip_flag [x0][y0][cIdx] equals to 0 specifying that the decision of whether the transform operation is applied to the associated transform block depends on other syntax elements. When this TS flag transform_skip_flag[x0][y0][cIdx] is not present in the video bitstream, the value of the TS flag is inferred as 1 if a corresponding BDPCM enabling flag BdpcmFlag[x0][y0][cIdx] is equal to 1, otherwise the value of the TS flag is inferred to be equal to 0.

In an alternative embodiment, the TS mode size constraint for both the luma and chroma components is determined by comparing a luma block size with the maximum transform skip size MaxTsSize. In this embodiment, the transform skip enabling flags for the luma and chroma components are signaled only when a luma block width tbWidth is smaller than or equal to MaxTsSize and a luma block height tbHeight is smaller than or equal to MaxTsSize.

```
if( sps_transform_skip_enabled_flag && !BdpcmFlag[ x0 ][ y0 ][ 1 ] &&
    tbWidth <= MaxTsSize && tbHeight <= MaxTsSize && !cu_sbt_flag )
    transform_skip_flag[ xC ][ yC ][ 1 ]                              ae(v)
```

```
if( sps_transform_skip_enabled_flag && !BdpcmFlag[ x0 ][ y0 ][ 2 ] &&
    tbWidth <= MaxTsSize && tbHeight <= MaxTsSize && !cu_sbt_flag )
    transform_skip_flag [ x0 ][ y0 ][ 2 ]                             ae(v)
if( !transform_skip_flag[ x0 ][ y0 ][ 2 ] )
```

Exemplary Flowcharts of Encoding and Decoding Process FIG. 1 illustrates an exemplary flowchart of a video processing method to be implemented in a video encoding system according to an embodiment of the present invention. The video encoding system receives input video data associated with one or more luma blocks and/or one or more corresponding chroma blocks in a current picture in step S102, where the input video data corresponds to pixel data to be encoded into a video bitstream. The one or more luma blocks and/or the one or more chroma blocks are intra blocks. For example, the luma block is a luma CB and the chroma block is a corresponding chroma CB within an intra CU, or the luma block is a luma TB and the chroma block is a corresponding chroma TB within the same TU in an intra CU. In step S104, the video encoding system compares a size of the luma block with a maximum transform skip size MaxTsSize. BDPCM is not allowed to be applied to the luma block(s) if the size of the luma block is larger than MaxTsSize in step S110, and the luma block(s) is predicted by intra prediction. The video encoding system determines whether BDPCM is applied to the luma block(s) in step S108 when the size of the luma block is smaller than or equal to MaxTsSize, and if BDPCM is applied to the luma block(s), a BDPCM luma enabling flag is set to 1 (i.e. true) and signaled in the video bitstream in step S116. The BDPCM luma enabling flag is set to 0 (i.e. false) and signaled in the video bitstream in step S118 if BDPCM is not applied to the luma block(s). The video encoding system also compares a size of the chroma block with MaxTsSize in step S106, and BDPCM is not allowed to be applied to the chroma block(s) if the size of the chroma block is larger than MaxTsSize in step S114 as the chroma block(s) is predicted by intra prediction. In cases of the size of the chroma block is smaller than or equal to MaxTsSize, the video encoding system determines whether BDPCM is applied to the chroma block(s) in step S112. A BDPCM chroma enabling flag is set to 1 (i.e. true) and signaled in the video bitstream in step S120 when BDPCM is applied to the chroma block(s), and the BDPCM chroma enabling flag is set to 0 (i.e. false) and signaled in the video bitstream in step S122 when BDPCM is not applied to the chroma block(s). Intra prediction is applied to the chroma block(s) when the BDPCM chroma enabling flag is set to 0. The one or more luma blocks and/or the one or more chroma blocks in the current block are encoded to form the video bitstream in step S124.

Figure 2:
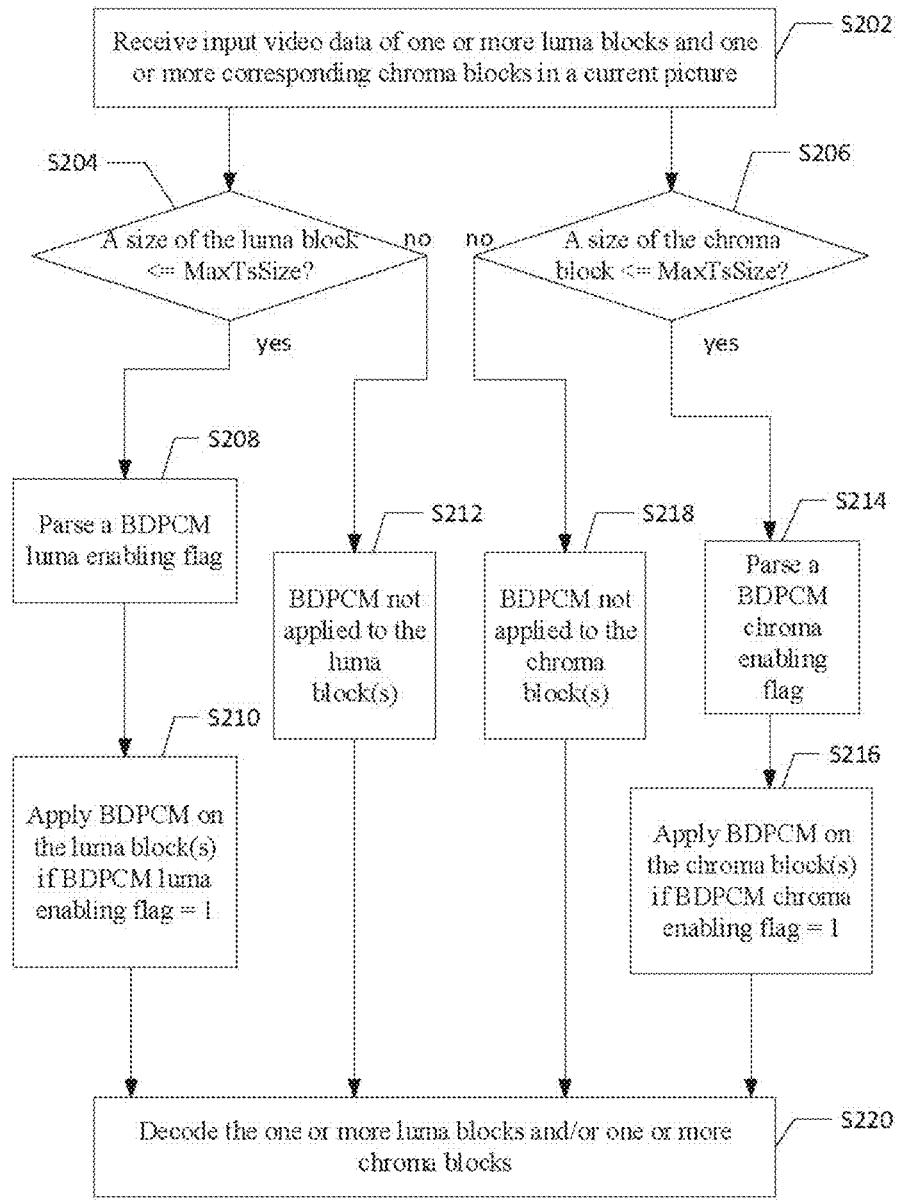
FIG. 2 is a flowchart illustrating an exemplary video processing method for a video decoding system according to an embodiment of the present invention.

FIG. 2 illustrates an exemplary flowchart of a video processing method to be implemented in a video decoding system according to an embodiment of the present invention. The video decoding system receives input compressed video data associated with one or more luma blocks and/or one or more corresponding chroma blocks in step S202, where the input compressed video data corresponds to coded data or prediction residues to be decoded. The luma blocks and/or the chroma blocks are intra blocks such as CBs within an intra CU. The video decoding system compares a size of the luma block with a maximum transform skip size MaxTsSize in step S204, and if the size of the luma block is smaller than or equal to MaxTsSize, the video decoding system parses a BDPCM luma enabling flag in step S208. In step S210, the video decoding system applies BDPCM on the luma block(s) if the BDPCM luma enabling flag indicates BDPCM is enabled, otherwise the video decoding system decodes and reconstructs the luma block(s) by intra prediction if the BDPCM luma enabling flag indicates BDPCM is disabled. In cases of the luma block having a size larger than MaxTsSize, BDPCM is not applied to the luma block(s) in step S212 as the video decoding system decodes and reconstructs the luma block(s) by intra prediction. Similar to the luma block, the video decoding system compares a size of the chroma block with MaxTsSize in step S206, and if the size of the chroma block is smaller than or equal to MaxTsSize, the video decoding system parses a BDPCM chroma enabling flag in step S214, and adaptively applies BDPCM on the chroma block(s) according to the value of the BDPCM chroma enabling flag in step S216. BDPCM is not applied to the chroma block(s) if the size of the chroma block is larger than MaxTsSize as intra prediction is applied to predict the chroma block(s). The video decoding system decodes the one or more luma blocks and/or the one or more chroma blocks in step S220. Residues of the luma block(s) are processed by the TS mode if BDPCM is applied to the luma block(s), and residues of the chroma block(s) are processed by the TS mode if BDPCM is applied to the chroma block(s) as the TS mode is always selected for processing residues of a BDPCM block.

Figure 3:
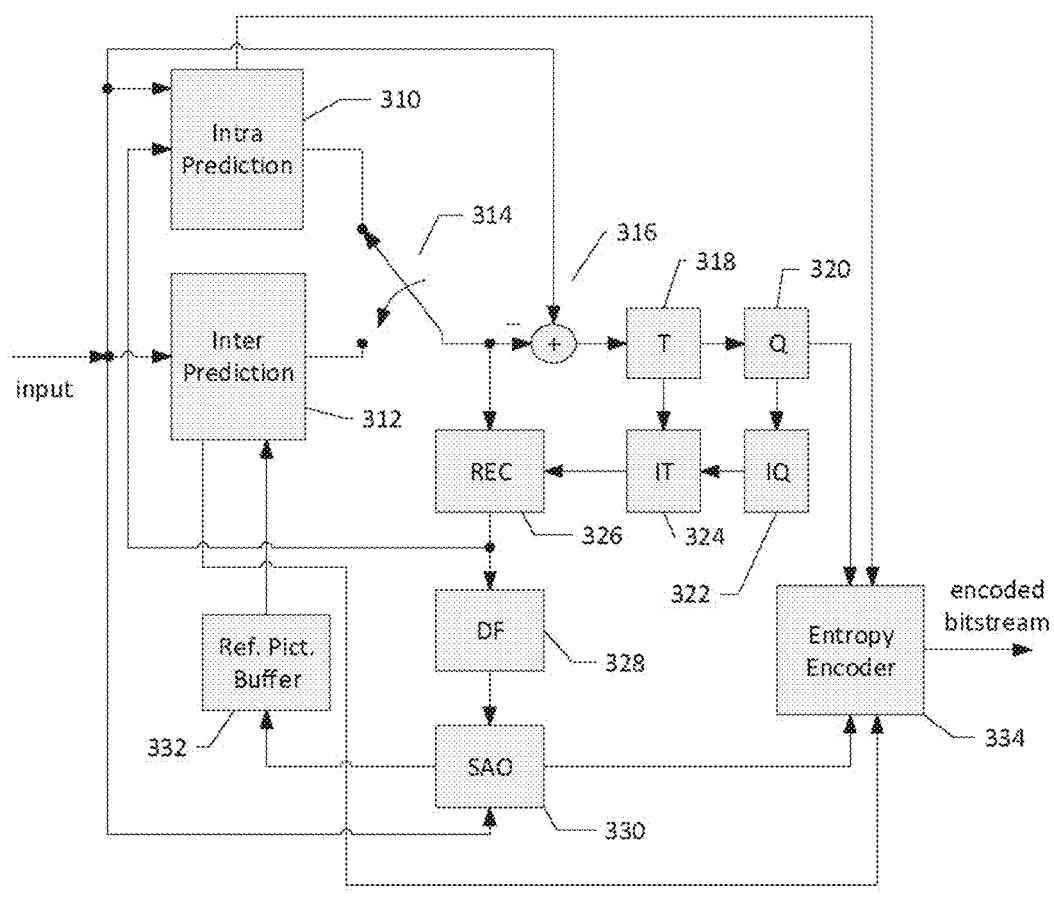
FIG. 3 illustrates an exemplary system block diagram for a video encoding system incorporating the video processing method according to embodiments of the present invention.

Video Encoder and Decoder Implementations The foregoing proposed video processing methods can be implemented in video encoders or decoders. For example, a proposed video processing method is implemented in an intra prediction module of an encoder, and/or an intra prediction module of a decoder. Alternatively, any of the proposed methods is implemented as a circuit coupled to the intra prediction module of the encoder and/or the intra prediction module of the decoder, so as to provide the information needed by the deblocking filter. FIG. 3 illustrates an exemplary system block diagram for a Video Encoder 300 implementing various embodiments of the present invention. An Intra Prediction module 310 provides intra predictors based on reconstructed video data of a current picture. An Inter Prediction module 312 performs motion estimation (ME) and motion compensation (MC) to provide inter predictors based on video data from other picture or pictures. For each block, either the Intra Prediction module 310 or Inter Prediction module 312 supplies the selected predictor to an Adder module 316 to form prediction errors, also called prediction residues. In an exemplary embodiment of the present invention, a size of each luma block in an intra block is compared to a maximum transform skip size and BDPCM is only allowed to be applied to the luma block if the size of the luma block is smaller than or equal to the maximum transform skip size. A size of each chroma block in an intra block is compared to the maximum transform skip size and BDPCM is only allowed to be applied to the chroma block if the size of the chroma block is smaller than or equal to the maximum transform skip size. A BDPCM enabling flag is signaled in the video bitstream for each luma or chroma block with a size for the luma or chroma block smaller than or equal to the maximum transform skip size. For each luma or chroma block encoded by BDPCM, each current pixel in the luma or chroma block is predicted by one or more neighboring pixels of the current pixel in the current picture. A predictor for each current pixel in the luma or chroma block coded by BDPCM is determined from the neighboring pixels of the current pixel, and a residue for each current pixel is determined according to the predictor of each current pixel. The prediction residues of each block are normally further processed by a Transform module (T) 318 followed by a Quantization module (Q) 320, however, the prediction residues of BDPCM coded blocks are quantized in a spatial domain instead of transforming into a frequency domain, in this case, the residue of each current pixel in the luma or chroma block is processed by the Quantization module 320 to generate a quantized residue. The quantized residues and the predictor (horizontal or vertical) are then encoded by an Entropy Encoder 332 to form a video bitstream. The video bitstream is then packed with side information. The quantized residue of each current pixel in the luma or chroma block is then processed by an Inverse Quantization module (IQ) 322 to de-quantize the quantized residues. Since the transform operation is skipped for the residues of each BDPCM coded block, the de-quantized residues of the BDPCM coded block are not processed by an Inverse Transform module (IT) 324. In some embodiments of the present invention, the size constraint for applying BDPCM is aligned with the size constraint for applying the TS mode, for example, the TS mode is only allowed for luma and/or chroma blocks smaller than or equal to the maximum transform skip size. As shown in FIG. 3, each current pixel is reconstructed by adding the reconstructed residues back to the predictor of each current pixel at Reconstruction module (REC) 326 to produce reconstructed video data. Each reconstructed current pixel of the luma or chroma block is then used to predict a next pixel in the same block according to a raster scan order according to an embodiment. The reconstructed video data may be stored in a Reference Picture Buffer (Ref. Pict. Buffer) 332 and used for prediction of other pictures. The reconstructed video data recovered from the REC 326 may be subject to various impairments due to encoding processing; consequently, an In-loop processing Deblocking Filter (DF) 328 and a Sample Adaptive Offset (SAO) 330 are applied to the reconstructed video data before storing in the Reference Picture Buffer 332 to further enhance picture quality. Syntax associated with information for the in-loop processing DF 328 and SAO 330 are provided to the Entropy Encoder 334 for incorporation into the encoded video bitstream.

Figure 4:
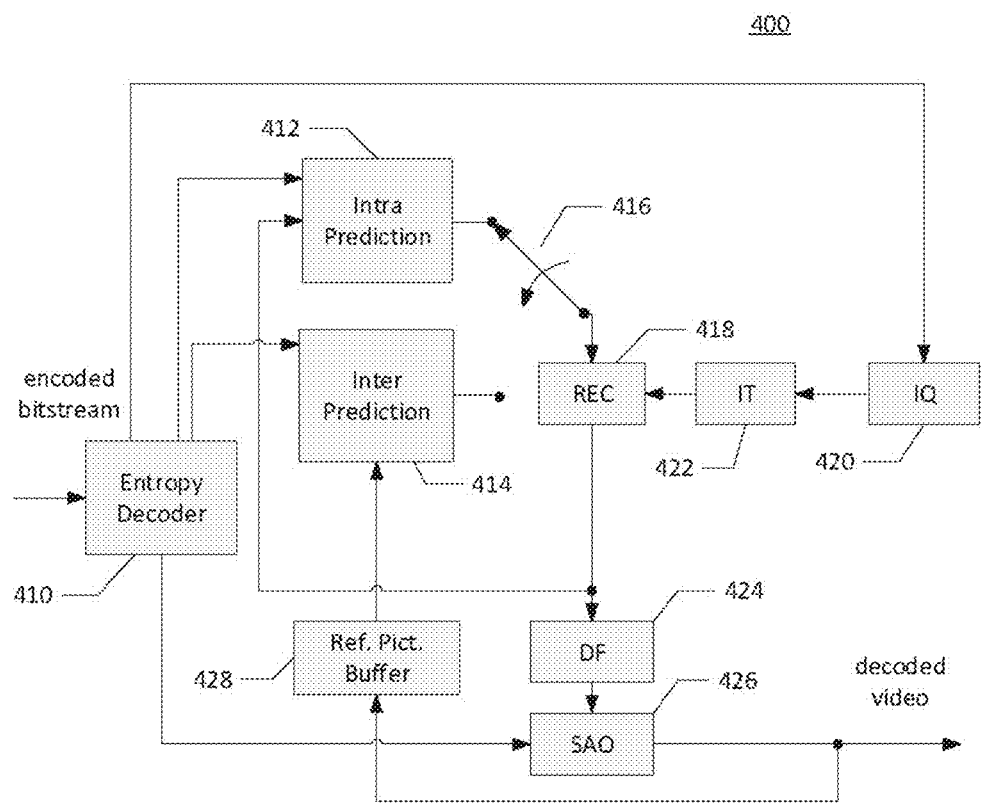
FIG. 4 illustrates an exemplary system block diagram for a video decoding system incorporating the video processing method according to embodiments of the present invention.

A corresponding Video Decoder 400 for decoding the video bitstream generated from the Video Encoder 300 of FIG. 3 is shown in FIG. 4. The video bitstream is the input to the Video Decoder 400 and is decoded by an Entropy Decoder 410 to parse and recover the quantized residues and other system information. The decoding process of the Decoder 400 is similar to the reconstruction loop at the Encoder 300, except that the Decoder 400 only requires motion compensation prediction in an Inter Prediction module 414. Each block in a current picture is decoded by either an Intra Prediction module 412 or Inter Prediction module 414. A size of a luma block or chroma block in the current picture in some embodiments of the present invention is compared with the maximum transform skip size, where BDPCM is only allowed to be used to decode the luma block if the size of the luma block is smaller than or equal to the maximum transform skip size, and BDPCM is only allowed to be used to decode the chroma block if the size of the chroma block is smaller than or equal to the maximum transform skip size. The Video Decoder 400 parses a corresponding BDPCM enabling flag when the size of the luma or chroma block is smaller than or equal to the maximum transform skip size, and applies BDPCM to the luma or chroma block according to a prediction direction when the BDPCM enabling flag indicates BDPCM is enabled. The prediction direction is selected from horizontal and vertical directions and is parsed from the video bitstream when the corresponding BDPCM enabling flag indicates BDPCM is enabled. A switch module 416 selects an intra predictor from the Intra Prediction module 412 or an inter predictor from the Inter Prediction module 414 according to decoded mode information. The quantized residues associated with each current pixel of the luma or chroma block coded in BDPCM is de-quantized by an Inverse Quantization module (IQ) 420 to generate de-quantized residues. The inverse transform operation performed in an Inverse Transform module (IT) 422 is skipped when processing a BDPCM coded block. Each current pixel is reconstructed by adding back the reconstructed residues for each current pixel with the predictor of each current pixel in the REC 418 to produce reconstructed video data. Each reconstructed current pixel in the luma or chroma block is used to predict a next pixel in the same block according to a raster scan order. The reconstructed video data is further processed by a Deblocking Filter (DF) 424 and Sample Adaptive Offset (SAO) 426 to generate final decoded video. If the currently decoded picture is a reference picture, the reconstructed video of the currently decoded picture is also stored in Ref. Pict. Buffer 528 for later pictures in a decoding order.

Various components of Video Encoder 300 and Video Decoder 400 in FIG. 3 and FIG. 4 may be implemented by hardware components, one or more processors configured to execute program instructions stored in a memory, or a combination of hardware and processor. For example, a processor executes program instructions is used to control setting a size constraint for enabling BDPCM. The processor is equipped with a single or multiple processing cores. In some examples, the processor executes program instructions to perform functions in some components in Encoder 300 and Decoder 400, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 3 and 4, the Encoder 300 and Decoder 400 may be implemented in the same electronic device, so various functional components of the Encoder 300 and Decoder 400 may be shared or reused if implemented in the same electronic device. For example, one or more of the Reconstruction module 326, Inverse Transform module 324, Inverse Quantization module 322, Deblocking Filter 328, Sample Adaptive Offset 330, and Reference Picture Buffer 332 in FIG. 3 may also be used to function as the Reconstruction module 418, Inverse Transform module 422, Inverse Quantization module 420, Deblocking Filter 424, Sample Adaptive Offset 426, and Reference Picture Buffer 428 in FIG. 4, respectively.

Embodiments of the video processing method for encoding or decoding may be implemented in a circuit integrated into a video compression chip or program codes integrated into video compression software to perform the processing described above. For examples, applying BDPCM on a luma component or chroma components may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video encoding or decoding method in a video encoding or decoding system, comprising:
   receiving input video data of a luminance (luma) block and one or more corresponding chrominance (chroma) blocks in a current picture or receiving input compressed video data of a luminance (luma) block and one or more corresponding chrominance (chroma) blocks in a current picture;
   comparing a maximum transform skip size with a size of the luma block and/or comparing the maximum transform skip size with a size of the chroma block;
   signaling or parsing a Block-based Delta Pulse Code Modulation (BDPCM) luma enabling flag for the luma block when the size of the luma block is smaller than or equal to the maximum transform skip size, and/or signaling or parsing a BDPCM chroma enabling flag for the chroma block when the size of the chroma block is smaller than or equal to the maximum transform skip size;
   applying BDPCM on the luma block when the BDPCM luma enabling flag for the luma block indicates BDPCM is enabled or applying intra prediction on the luma block when the BDPCM luma enabling flag for the luma block indicates BDPCM is disabled, and/or applying BDPCM on the one or more chroma blocks when the BDPCM chroma enabling flag for the chroma block indicates BDPCM is enabled or applying intra prediction on the one or more chroma blocks when the BDPCM chroma enabling flag for the chroma block indicates BDPCM is disabled; and
   encoding or decoding the luma block and the one or more chroma blocks.

2. The method of claim 1, wherein the size of the chroma block comprises a width and a height of the chroma block, wherein the width of the chroma block is derived by a width of the luma block and a color format sampling structure of the input video data and the height of the chroma block is derived by a height of the luma block and the color format sampling structure of the input video data.

3. The method of claim 2, wherein the width of the chroma block is equal to the width of the luma block divided by a variable SubWidthC and the height of the chroma block is equal to the height of the luma block divided by a variable SubHeightC, wherein the variable SubWidthC is equal to 2 when a color format is 4:2:0 or 4:2:2 or is equal to 1 when the color format is monochrome or 4:4:4, and the variable SubHeightC is equal to 2 when the color format is 4:2:0 or is equal to 1 when the color format is monochrome, 4:2:2, or 4:4:4.

4. The method of claim 1, wherein the luma block is a luma Coding Blocks (CB), and the one or more chroma blocks are chroma CBs.

5. The method of claim 4, wherein the luma CB and the one or more chroma CBs belong to a same Coding Unit (CU).

6. The method of claim 1, further comprising signaling or parsing a BDPCM luma direction flag to indicate whether a horizontal or vertical direction is applied to predict the luma block when the BDPCM luma enabling flag indicates BDPCM is enabled, and/or signaling or parsing a BDPCM chroma direction flag to indicate whether a horizontal or vertical direction is applied to predict the chroma block when the BDPCM chroma enabling flag indicates BDPCM is enabled.

7. The method of claim 1, further comprising signaling or parsing a Sequence Parameter Set (SPS) level BDPCM enabling flag, wherein the BDPCM luma enabling flag is only signaled or parsed when the SPS level BDPCM enabling flag indicates BDPCM is enabled for a luma component, and/or the BDPCM chroma enabling flag is only signaled or parsed when the SPS level BDPCM enabling flag indicates BDPCM is enabled for chroma components.

8. The method of claim 1, wherein the luma block comprises one or more luma transform blocks and/or the one or more chroma blocks comprise one or more chroma transform blocks.

9. The method of claim 8, further comprising signaling or parsing a transform skip enabling flag for the luma transform block when a size of the luma transform block is smaller than or equal to the maximum transform skip size and/or signaling or parsing a transform skip enabling flag for the chroma transform block when a size of the chroma transform block is smaller than or equal to the maximum transform skip size, wherein residues of the luma transform block are processed by a transform skip mode when the transform skip enabling flag for the luma transform block indicates the transform skip mode is enabled, and/or residues of the chroma transform block are processed by the transform skip mode when the transform skip enabling flag for the chroma transform block indicates the transform skip mode is enabled.

10. The method of claim 9, wherein the transform skip mode is applied to process the residues of the luma transform block when BDPCM is applied on the luma block and/or the transform skip mode is applied to process the residues of the chroma transform block when BDPCM is applied on the chroma block.

11. The method of claim 1, wherein a syntax element associated with the maximum transform skip size is signaled in or parsed from a Sequence Parameter Set (SPS) or Picture Parameter Set (PPS) corresponding to the current picture.

12. The method of claim 11, wherein the maximum transform skip size defines a maximum block width or height allowed for selecting a transform skip mode, wherein residues of a transform block are encoded or decoded without a transform operation when the transform block is processed by the transform skip mode.

13. An apparatus of encoding or decoding video data in a video encoding or decoding system, the apparatus comprising one or more electronic circuits configured for:
receiving input video data of a luminance (luma) block and one or more corresponding chrominance (chroma) blocks in a current picture or receiving input compressed video data of a luma block and one or more corresponding chroma blocks in a current picture;
comparing a maximum transform skip size with a size of the luma block and/or comparing the maximum transform skip size with a size of the chroma block;
signaling or parsing a Block-based Delta Pulse Code Modulation (BDPCM) luma enabling flag for the luma block when the size of the luma block is smaller than or equal to the maximum transform skip size, and/or signaling or parsing a BDPCM chroma enabling flag for the chroma block when the size of the chroma block is smaller than or equal to the maximum transform skip size;
applying BDPCM on the luma block when the BDPCM luma enabling flag for the luma block indicates BDPCM is enabled or applying intra prediction on the luma block when the BDPCM luma enabling flag for the luma block indicates BDPCM is disabled, and/or applying BDPCM on the one or more chroma blocks when the BDPCM chroma enabling flag for the chroma block indicates BDPCM is enabled or applying intra prediction on the one or more chroma blocks when the BDPCM chroma enabling flag for the chroma block indicates BDPCM is disabled; and
encoding or decoding the luma block and the one or more chroma blocks.

14. A video encoding or decoding method in a video encoding or decoding system, comprising:
receiving input video data of a current block in a current picture or receiving input compressed video data of a current block in a current picture;
checking a Block-based Delta Pulse Code Modulation (BDPCM) enabling condition for the current block;
signaling or parsing one or more Block-based Delta Pulse Code Modulation (BDPCM) enabling flags for the current block when the BDPCM enabling condition is satisfied;
applying BDPCM on one or more color components of the current block when the one or more BDPCM enabling flags for the current block indicate BDPCM is enabled;
checking a transform skip mode enabling condition for transform blocks in the current block, wherein the transform skip mode enabling condition is aligned with the BDPCM enabling condition for the current block;
signaling or parsing one or more transform skip enabling flags for the transform blocks in the current block when the transform skip mode enabling condition is satisfied;
applying a transform skip mode on one or more color components of the transform blocks in the current block when the one or more transform skip enabling flags for the transform blocks in the current block indicate the transform skip mode is enabled;
encoding or decoding the current block in the current picture.

15. The method of claim 14, wherein the BDPCM enabling condition and the transform skip mode enabling condition correspond to a size constraint for a luma component and/or a size constraint for chroma components.

16. The method of claim 15, wherein the size constraint for the luma component compares a size of a luma block in the current block to a maximum transform skip size and the size constraint for the chroma components compares a size of a chroma block in the current block to the maximum transform skip size.

17. The method of claim 16, wherein the size of the chroma block comprises a width and a height of the chroma block, wherein the width of the chroma block is derived by a width of the luma block and a color format sampling structure of the input video data and the height of the chroma block is derived by a height of the luma block and the color format sampling structure of the input video data.

18. The method of claim 17, wherein the width of the chroma block is equal to the width of the luma block divided by a variable SubWidthC and the height of the chroma block is equal to the height of the luma block divided by a variable SubHeightC, wherein the variable SubWidthC is equal to 2 when a color format is 4:2:0 or 4:2:2 or is equal to 1 when the color format is monochrome or 4:4:4, and the variable SubHeightC is equal to 2 when the color format is 4:2:0 or is equal to 1 when the color format is monochrome, 4:2:2, or 4:4:4.

19. The method of claim 16, wherein a syntax element associated with the maximum transform skip size is signaled in or parsed from a Sequence Parameter Set (SPS) or Picture Parameter Set (PPS) corresponding to the current picture.

20. The method of claim 15, wherein both the size constraint for the luma component and the size constraint for the chroma components compare a size of a luma block in the current block to a maximum transform skip size.

21. The method of claim 15, wherein the size constraint for the luma component compares a size of a luma block in the current block to a maximum transform skip size and the size constraint for the chroma components compares a size of the luma block in the current block to an adjusted maximum transform skip size, wherein the adjusted maximum transform skip size is derived by the maximum transform skip size and a color format sampling structure of the input video data.

* * * * *